US010284985B1

(12) United States Patent
Chaudhary et al.

(10) Patent No.: US 10,284,985 B1
(45) Date of Patent: May 7, 2019

(54) CROWD-SOURCED DEVICE LATENCY ESTIMATION FOR SYNCHRONIZATION OF RECORDINGS IN VOCAL CAPTURE APPLICATIONS

(71) Applicant: SMULE, INC., San Francisco, CA (US)

(72) Inventors: Amanda Chaudhary, San Francisco, CA (US); David Steinwedel, San Francisco, CA (US); John Shimmin, San Francisco, CA (US); Lance Jabr, San Francisco, CA (US); Randal Leistikow, Denver, CO (US)

(73) Assignee: SMULE, INC., San Francisco, CA (US)

( * ) Notice: Subject to any disclaimer, the term of this patent is extended or adjusted under 35 U.S.C. 154(b) by 87 days.

(21) Appl. No.: 15/178,234

(22) Filed: Jun. 9, 2016

Related U.S. Application Data

(63) Continuation-in-part of application No. 14/216,136, filed on Mar. 17, 2014, now Pat. No. 9,412,390.

(60) Provisional application No. 62/173,337, filed on Jun. 9, 2015, provisional application No. 61/798,869, filed on Mar. 15, 2013.

(51) Int. Cl.
| | | |
|---|---|---|
| *G06F 17/00* | (2006.01) |
| *H04R 29/00* | (2006.01) |
| *G10L 25/60* | (2013.01) |
| *G06F 3/16* | (2006.01) |

(52) U.S. Cl.
CPC ........... *H04R 29/004* (2013.01); *G06F 3/162* (2013.01); *G06F 3/165* (2013.01); *G10L 25/60* (2013.01)

(58) Field of Classification Search
CPC ....... G06F 3/162; G06F 3/165; H04R 29/004; G10L 25/60
See application file for complete search history.

(56) References Cited

U.S. PATENT DOCUMENTS

| | | |
|---|---|---|
| 6,996,068 B1 | 2/2006 | Sherlock |
| 7,333,519 B2 | 2/2008 | Sullivan |
| 8,452,432 B2 | 5/2013 | Transeau |
| 8,983,829 B2 | 3/2015 | Cook et al. |
| 9,002,671 B2 | 4/2015 | Kan |
| 9,412,390 B1 | 8/2016 | Chaudhary |
| 2001/0016783 A1 | 8/2001 | Graumann |
| 2003/0215096 A1 | 11/2003 | Graumann |
| 2005/0288905 A1 | 12/2005 | Dinu |
| 2006/0083163 A1 | 4/2006 | Rosen |
| 2006/0140414 A1 | 6/2006 | Higashihara |
| 2007/0086597 A1 | 4/2007 | Kino |
| 2007/0140510 A1 | 6/2007 | Redmann |
| 2008/0152185 A1 | 6/2008 | Puckette |
| 2008/0279266 A1* | 11/2008 | Wang .................. H04L 43/0852 375/224 |

(Continued)

*Primary Examiner* — Joseph Saunders, Jr.
(74) *Attorney, Agent, or Firm* — Haynes and Boone, LLP

(57) ABSTRACT

Latency on different devices (e.g., devices of differing brand, model, vintage, etc.) can vary significantly and tens of milliseconds can affect human perception of lagging and leading components of a performance. As a result, use of a uniform latency estimate across a wide variety of devices is unlikely to provide good results, and hand-estimating round-trip latency across a wide variety of devices is costly and would constantly need to be updated for new devices. Instead, a system has been developed for crowdsourcing latency estimates.

15 Claims, 6 Drawing Sheets

(56) References Cited

U.S. PATENT DOCUMENTS

| | | |
|---|---|---|
| 2009/0252343 A1 | 10/2009 | Mao |
| 2011/0299691 A1 | 12/2011 | Yoshino |
| 2012/0265524 A1 | 10/2012 | McGowan |
| 2013/0208911 A1 | 8/2013 | Millington |
| 2013/0336498 A1 | 12/2013 | Haatainen |
| 2015/0036833 A1 | 2/2015 | Lukasczyk |
| 2015/0195666 A1* | 7/2015 | Massey ............... H04R 29/001 381/59 |
| 2015/0201292 A1 | 7/2015 | Wang |
| 2015/0271616 A1 | 9/2015 | Kechichian |

* cited by examiner

CROWD-SOURCED DEVICE LATENCY ESTIMATION FOR SYNCHRONIZATION OF RECORDINGS IN VOCAL CAPTURE APPLICATIONS

CROSS-REFERENCE TO RELATED APPLICATION(S)

The present application claims priority of U.S. Provisional Application No. 62/173,337, filed Jun. 9, 2015, and is a continuation-in-part of U.S. application Ser. No. 14/216, 136, filed Mar. 17, 2014, which in turn, claims priority of U.S. Provisional Application No. 61/798,869, filed Mar. 15, 2013.

In addition, the present application is related to commonly-owned, U.S. patent application Ser. No. 13/085,414, filed Apr. 12, 2011, entitled "COORDINATING AND MIXING VOCALS CAPTURED FROM GEOGRAPHICALLY DISTRIBUTED PERFORMERS" and naming Cook, Lazier, Lieber and Kirk as inventors, which in turn claims priority of U.S. Provisional Application No. 61/323,348, filed Apr. 12, 2010. The present application is also related to U.S. Provisional Application No. 61/680,652, filed Aug. 7, 2012, entitled "KARAOKE SYSTEM AND METHOD WITH REAL-TIME, CONTINUOUS PITCH CORRECTION OF VOCAL PERFORMANCE AND DRY VOCAL CAPTURE FOR SUBSEQUENT RE-RENDERING BASED ON SELECTIVELY APPLICABLE VOCAL EFFECT(S) SCHEDULE(S)" and naming Yang, Kruge, Thompson and Cook, as inventors. Each of the aforementioned applications is incorporated by reference herein.

BACKGROUND

Field of the Invention

The invention(s) relates (relate) generally to capture and/or processing of vocal performances and, in particular, to techniques suitable for addressing latency variability in audio subsystems (hardware and/or software) of deployment platforms for karaoke and other vocal capture type applications.

Description of the Related Art

The installed base of mobile phones and other portable computing devices grows in sheer number and computational power each day. Hyper-ubiquitous and deeply entrenched in the lifestyles of people around the world, they transcend nearly every cultural and economic barrier. Computationally, the mobile phones of today offer speed and storage capabilities comparable to desktop computers from less than ten years ago, rendering them surprisingly suitable for real-time sound synthesis and other musical applications. Partly as a result, some modern mobile phones, such as the iPhone® handheld digital device, available from Apple Inc., as well as competitive devices that run the Android™ operating system, all tend to support audio and video playback quite capably, albeit with increasingly diverse and varied runtime characteristics.

As digital acoustic researchers seek to transition their innovations to commercial applications deployable to modern handheld devices such as the iPhone® handheld and other iOS® and Android™ platforms operable within the real-world constraints imposed by processor, memory and other limited computational resources thereof and/or within communications bandwidth and transmission latency constraints typical of wireless networks, significant practical challenges present. The success of vocal capture type applications, such as the I Am T-Pain, Glee Karaoke and Sing! Karaoke applications popularized by Smule Inc., is a testament to the sophistication digital acoustic processing achievable on modern handheld device platforms. iPhone is a trademark of Apple, Inc., iOS is a trademark of Cisco Technology, Inc. used by Apple under license and Android is a trademark of Google Inc.

One set of practical challenges that exists results from the sheer variety of handheld device platforms (and versions thereof) that now (or will) exist as possible deployment platforms for karaoke and other vocal capture type applications, particularly within the Android device ecosystem. Variations in underlying hardware and software platforms can create timing, latency and/or synchronization problems for karaoke and other vocal capture type application deployments. Improved techniques are desired.

SUMMARY

Processing latency through audio subsystems can be an issue for karaoke and vocal capture applications because captured vocals should, in general, be synchronized to the original background track against which they are captured and, if applicable, to other sung parts. For many purpose-built applications, latencies are typically known and fixed. Accordingly, appropriate compensating adjustments can be built into an audio system design a priori. However, given the advent and diversity of modern handheld devices such as the iPhone® handheld and other iOS® and Android™ platforms and the popularization of such platforms for audio and audiovisual processing, actual latencies and, indeed, variability in latency through audio processing systems have become an issue for developers. It has been discovered that, amongst target platforms for vocal capture applications, significant variability exists in audio/audiovisual subsystem latencies.

In particular and for example, for many handheld devices distributed as an Android platform, the combined latency of audio output and recording can be quite high, at least as compared to certain iOS® platforms. In general, overall latencies through the audio (or audiovisual) subsystems of a given device can be a function of the device hardware, operating system and device drivers. Additionally, latency can be affected by implementation choices appropriate to a given platform or deployment, such as increased buffer sizes to avoid audio dropouts and other artifacts.

Latency on different devices (e.g., devices of differing brand, model, configuration, vintage, etc.) can vary significantly, and tens of milliseconds can affect human perception of lagging and leading components of a performance. As a result, use of a uniform latency estimate across a wide variety of devices is unlikely to provide good results. Unfortunately, hand-estimating round-trip latency across a wide variety of devices is costly and would constantly need to be updated for new devices. Instead, a system has been developed for automatically estimating latency through audio subsystems using feedback recording and analysis of recorded audio.

In some embodiments in accordance with the present invention(s), a system includes a network-resident media content server or service platform and a plurality of network-connected computing devices. The computing devices are configured for vocal performance capture, wherein at least a first subset of the plurality thereof are of a consistent hardware and software configuration and wherein at least some of the plurality of devices differ in hardware or software configuration from those of the first subset. Based on audio signal captures performed at respective of the network-connected computing devices and communicated to the network-resident media content server or service platform, a temporal offset between audio features of the respective audio captures and one or more corresponding audio signals is computationally determined. Based on the computationally-determined temporal offsets, round-trip latency through audio systems of devices that match the hardware and software configuration of the first subset is characterized. Characterized round-trip latency is communicated to device instances of the first subset including those for which no temporal offset has been explicitly determined based on audio signal capture at the respective device instance.

In some cases or embodiments, consistency of hardware and software configuration shared by devices of the first subset includes consistency of plural attributes selected from the set of: hardware model; firmware version; operating system version; and audio subpath(s) used for audio playback and capture. In some cases or embodiments, audio signal capture-based determinations of round-trip latency are computed based on a first number of network-connected computing device instances of the first type. A second number of network-connected computing device instances of the first type are supplied with the characterized round-trip latency for use in connection with subsequent vocal captures thereon, wherein the second number substantially exceeds the first number by a factor of at least ten (10×).

In some embodiments, the system further includes software executable on a least some of the network-connected computing device instances of the first type to, at each such device instance, audibly render a backing track and capture vocals performed by a user against the backing track for use in the characterization of round-trip latency for the network-connected computing devices of the first type, wherein the computational determination of temporal offset is between respective audio features of vocal captures and backing track. In some cases, or embodiments, the computational determination of temporal offset is performed at the network-resident media content server or service platform.

In some embodiments, the system further includes software executable on a least some of the network-connected computing device instances of the first type to, at each such device instance, supply a test signal at a respective audio output thereof and to capture a corresponding audio signal at an audio input thereof for use in the characterization of round-trip latency for the network-connected computing devices of the first type.

In some cases or embodiments, the computing devices are selected from the set of a mobile phone, a personal digital assistant, a laptop or notebook computer, a pad-type computer and a net book In some cases or embodiments, at least some of the computing devices are selected from the set of audiovisual media devices and connected set-top boxes.

In other embodiments in accordance with the present invention(s), a method includes crowdsourcing round-trip latency characterizations for a plurality of network-connected computing devices configured for vocal performance capture. For respective subsets of the plurality of network-connected computing devices, each subset having a consistent hardware and software configuration, the method further includes sampling substantially less than all devices of the subset to characterize round-trip latency through audio systems of substantially all devices of the subset, wherein the sampling includes audio signal captures and determinations of temporal offset between audio features of the respective audio signal captures and corresponding audio signals.

In some cases or embodiments, the audio signal captures include vocal audio captured karaoke-style at a particular device instance against an audible rendering of a corresponding backing track. In some cases or embodiments, the audio signal captures include captures, at an audio input of a particular device instance, a test signal supplied at audio output of the particular device instance.

In some embodiments, the sampling includes audibly rendering a backing track at a particular device instance and, at the device instance, capturing vocals performed by a user against the backing track, wherein the determination of temporal offset is between respective audio features of the vocal capture and the backing track. In some cases or embodiments, the determination of temporal offset is performed at a network-resident media content server or service platform.

In some embodiments, the sampling includes supplying a test signal at a respective audio output of a particular device instance and capturing a corresponding audio signal at an audio input of the particular device instance, wherein the determination of temporal offset is between respective audio features of the test signal as supplied and captured.

In still other embodiments in accordance with the present invention(s), a method includes using a computing device for vocal performance capture and estimating round-trip latency through an audio subsystem of the computing device using the captured vocal performance. The computing device has a touch screen, a microphone interface and a communications interface.

In some cases or embodiments, the method further includes adjusting, based on the estimating, operation of vocal performance capture to adapt timing, latency and/or synchronization relative to a backing track or vocal accompaniment. In some cases, the round-trip latency estimate includes both input and out latencies through the audio subsystem of the portable computing device.

In some cases or embodiments, the feedback recording and analysis includes audibly transducing a series of pulses using a speaker of the computing device and recording the audibly transduced pulses using a microphone of the computing device. In some cases or embodiments, the feedback recording and analysis further includes recovering pulses from the recording by identifying correlated peaks in the recording based on an expected period of the audibly transduced pulses.

In some embodiments, the method further includes adapting operation of a vocal capture application deployment using the estimated round-trip latency. In some cases or embodiments, the vocal capture application deployment is on the computing device. In some cases or embodiments, the computing device is selected from the set of a mobile phone, a personal digital assistant, a laptop or notebook computer, a pad-type computer and a net book.

In some embodiments, the method further includes accommodating varied audio processing capabilities of a collection of device platforms by estimating the round-trip latency through the audio subsystem of the computing device and through audio subsystems of other device platforms of the collection.

In some embodiments, a computer program product is encoded in one or more non-transitory media. The computer program product includes instructions executable on a processor of the computing device to cause the computing device to perform the any of the preceding methods.

These and other embodiments in accordance with the present invention(s) will be understood with reference to the description and the appended claims which follow.

BRIEF DESCRIPTION OF THE DRAWINGS

The present invention(s) is (are) illustrated by way of example and not limitation with reference to the accompanying figures, in which like references generally indicate similar elements or features.

Figure 1:
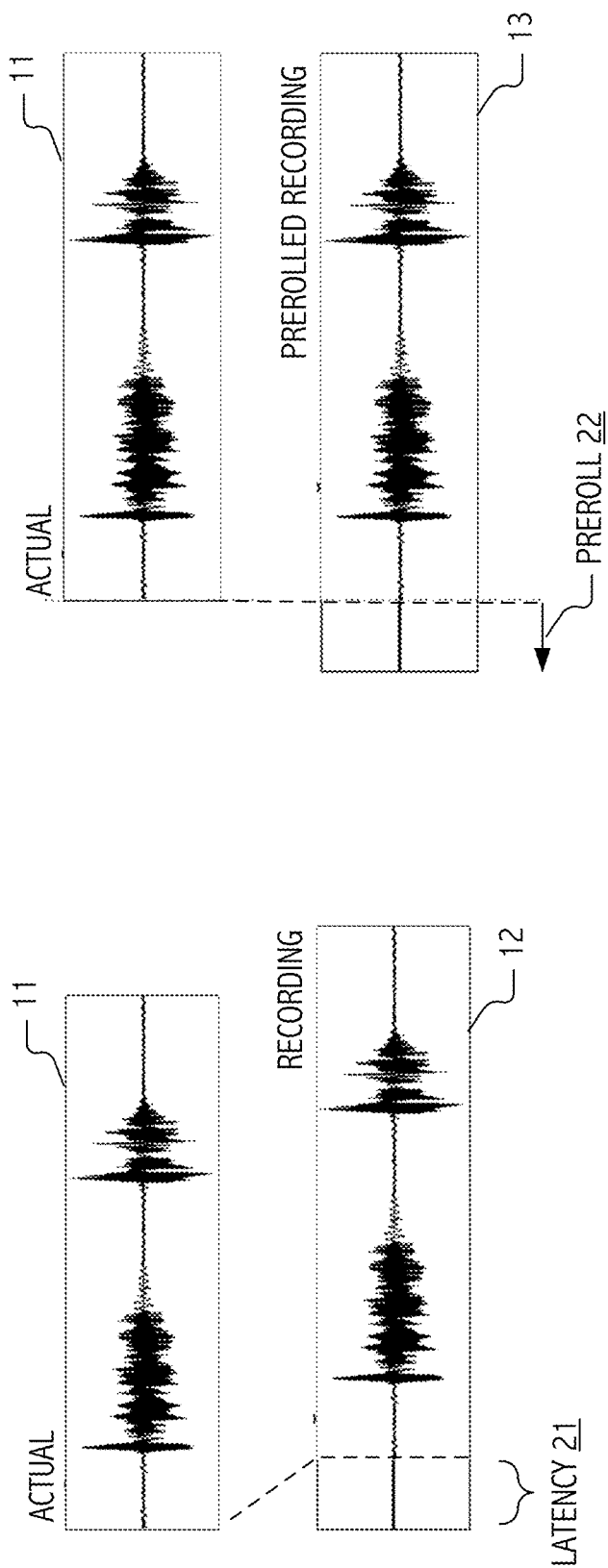
FIGS. 1A and 1B depict illustrative components of latencies that may be estimated for a given device in accordance with some embodiments of the present invention(s).

Skilled artisans will appreciate that elements or features in the figures are illustrated for simplicity and clarity and have not necessarily been drawn to scale. For example, the dimensions or prominence of some of the illustrated elements or features may be exaggerated relative to other elements or features in an effort to help to improve understanding of embodiments of the present invention.

DESCRIPTION OF THE PREFERRED EMBODIMENT(S)

Despite many practical limitations imposed by mobile device platforms and application execution environments, vocal musical performances may be captured and, in some cases or embodiments, pitch-corrected and/or processed for mixing and rendering with backing tracks in ways that create compelling user experiences. In some cases, the vocal performances of individual users are captured on mobile devices in the context of a karaoke-style presentation of lyrics in correspondence with audible renderings of a backing track. In some cases, additional vocals may be accreted from other users or vocal capture sessions or platforms. Performances can, in some cases, be pitch-corrected in real-time at the mobile device (or more generally, at a portable computing device such as a mobile phone, personal digital assistant, laptop computer, notebook computer, pad-type computer or net book) in accord with pitch correction settings. In order to accommodate the varied audio processing capabilities of a large and growing ecosystem of handheld device, and even audiovisual streaming or set-top box-type, platforms, including variations in operating system, firmware and underlying hardware capabilities, techniques have been developed to estimate audio subsystem latencies for a given karaoke and vocal capture application deployment and use those estimates to adapt operation of the given application to account for latencies that are not known (or perhaps knowable) a priori.

Latency Compensation, Generally

Processing latency through audio subsystems can be an issue for karaoke and vocal capture applications because captured vocals should, in general, be synchronized to the original background track against which they are captured and/or, if applicable, to other sung parts. For many purpose-built applications, latencies are typically known and fixed. Accordingly, appropriate compensating adjustments can be built into an audio system design a priori. However, given the advent and diversity of modern handheld devices such as the iPhone® handheld and other iOS® and Android™ platforms and the popularization of such platforms for audio and audiovisual processing, actual latencies and, indeed, variability in latency through audio processing systems have become an issue for developers. It has been discovered that, amongst target platforms for vocal capture applications, significant variability exists in audio/audiovisual subsystem latencies.

For many handheld devices distributed as an Android platform, the combined latency of audio output and recording can be quite high. This is true even on devices with purported "low latency" for Android operating system versions 4.1 and higher. Lower latency in these devices is primarily on the audio output side and input can still exhibit higher latency than on other platforms. In general, overall latencies through the audio (or audiovisual) subsystems of a given device can be a function of the device hardware, operating system and device drivers. Additionally, latency can be affected by implementation choices appropriate to a given platform or deployment, such as increased buffer sizes to avoid audio dropouts and other artifacts.

Latency on different devices (e.g., devices of differing brand, model, vintage, etc.) can vary significantly, and tens of milliseconds can affect human perception of lagging and leading components of a performance. In some case, operating system or firmware version can affect latency.

As a result, use of a uniform latency estimate across a wide variety of devices is unlikely to provide good results, and hand-estimating round-trip latency across a wide variety of devices is costly and would constantly need to be updated for new devices. Instead, a system has been developed for automatically estimating round-trip latency through audio subsystems using feedback recording and analysis of recorded audio. In general, round trip latency estimates are desirable because synchronization with a backing track or other vocals should generally account for both the output latency associated with audibly rendering the tracks that a user hears (and against which he or she performs) and the input latency associated with capturing and processing his or her vocals.

Latency Compensation, Generally

Although any of a variety of different measures or baselines may be employed, for purposes of understanding and illustration, latency is a difference in time between the temporal index assigned to a particular instant in a digital recording of the user's voice and the temporal index of the background track to which the user's physical performance is meant to correspond. If this time difference is large enough (e.g., over 20 milliseconds), the user's performance will perceptibly lag behind the backing or other vocal tracks. In a karaoke-type vocal capture application, overall latency can be understood as including both an output latency to audibly render a backing track or vocals and an input latency to capture and process the user's own vocal performance against the audibly rendered backing track or vocals.

FIG. 1A graphically illustrates (in connection with the actual 11 and recorded 12 waveforms of a voiced utterance) an input latency 21 portion of such overall latency. In order to compensate for this latency (if known), it is desirable to preroll the recording ahead by a corresponding amount of time to perceptually realign it with the background against which it was actually performed. In general, the latency (and necessary preroll to compensate for it) are relatively stable on a particular device and are primarily a function of the device hardware, operating system, and device drivers. In the illustration of FIG. 1B, preroll 22 fully compensates for the input latency 21. If output latencies are negligible for a given platform (device hardware, operating system, and device driver combination) or are otherwise known, then it may be sufficient to estimate the input latency.

However, more generally, there is at least some finite output latency to audibly render the backing track or vocals against which against which the user's vocals are actually performed. This total latency is tested on and computationally estimated for a particular device (or device type) as a round-trip latency. Once estimated, the latency can be applied as a preroll to, in the future, temporally align captured vocals with the backing track and/or vocals against which those captured vocals are performed.

Techniques based on direct measurements and statistical samplings are described. Crowd-sourced information is utilized in some embodiments and, computations for audio feature extraction, statistical estimation and temporal offset determinations may be performed at individual devices, at a content server or hosted service platform, or using some combination of the foregoing.

Latency Estimation Technique—Test Signal

On a given device (or device type), it is possible to test and computationally estimate a total round-trip latency through the audio subsystem as follows:

1) A known audio signal with distinct temporal features is used to perform the test. In some embodiments, a 4 Hz pulse train of 5 second duration is used.
2) The known audio signal with distinct temporal features (e.g., the pulse train) is played as an audio output (e.g., out the speakers) of the device.
3) A corresponding audio input is captured via an audio input of the device. For example, the audio played out of the device's speakers may be simultaneously captured via the device's microphone to produce a recording of the original audio signal processed through the device. If available or desirable, a cable or other audio signal path can be used to connect the device's audio output to its input in order to eliminate environmental issues.
4) The recorded audio is analyzed in order to recover as many of the pulses (or other temporal features) as possible. In embodiments that employ a pulse train as the known audio signal, a series of correlated peaks recovered from the recorded signal should be separated by a period that approximates that of the original pulse train (i.e., 250 ms for the 4 Hz signal). Any of a variety of detection mechanisms may be employed. However, in some embodiments, correlation is determined by calculating how close the ratios of temporal offsets between peaks are to an integer ratio. In some embodiments, a process or method functionally defined by execution of code consistent with the following is used to calculate peaks and then determine a correlated sequence.

```
void PeakDetector::CalculatePeaks ( ) {
  //mWaveFile is our recording
  //mPeaks is our list of detected peaks in the signal
  //mPeakWindow is the length of time in samples we
  // use to find a peak
  int channels = 1;
  int prevPeakLocation = -mPeakWindow;
  if (mWavFile.GetStereo ( )) {
    channels = 2;
  }
  //first calibrate to a threshold in the source
  // audio
  CalculatePeakThreshold ( );
  //now begin to find potential peaks
  mWavFile.SeekSamples (0);
  short buffer[1024];
  int count;
  int runningCount = 0;
  while ((count =
          mWavFile.ReadSamples(buffer,mPeakWindow))) {
    int maxsample = 0;
    for (int i = 0; i < count; ++i) {
      int sample = abs (buffer[i * channels]);
      if (sample > maxsample) {
        maxsample = sample;
      }
      if (sample >= mPeakThreshold) {
        if (runningCount + i - prevPeakLocation >
            mPeakWindow) {
          mPeaks.push_back(Peak(runningCount + i,
              sample));
          prevPeakLocation = runningCount + i;
          break;
        }
      }
    }
    runningCount += count;
  }
}
void PeakDetector::Correlate ( ) {
  //find all peaks that are separated by a multiple
  //of the correlation distance mPeaks is the list
  //of peaks detected in the previous function
  for (PeakList::iterator
          p =mPeaks.begin ( ); p != mPeaks.end ( ); ++p) {
    PeakList::iterator q;
    for (q = p, ++q; q != mPeaks.end ( ); ++q) {
      int delta = q->sample - p->sample;
      float ratio = delta /
          float(mCorrelationDistance);
      if (roundf(ratio) > 0.0f &&
              integerness < mIntegralThreshold) {
        ++mCorrelatedPeaks[*p];
        ++mCorrelatedPeaks[*q];
      }
    }
  }
  //clean out all the potentially correlated peaks
  //that appear with lower frequency
  int maxPeakFreq = 0;
  for (map<Peak,int>::iterator
          p = mCorrelatedPeaks.begin ( );
          p != mCorrelatedPeaks.end ( );
          ++p) {
    if (p->second > maxPeakFreq) {
      maxPeakFreq = p->second;
    }
  }
  for (map<Peak,int>::iterator
          p = mCorrelatedPeaks.begin ( );
          p != mCorrelatedPeaks.end ( ); ) {
```

```
        if (p->second < maxPeakFreq) {
          mCorrelatedPeaks.erase(p++);
        } else {
          ++p;
        }
      }
    }
  }
```

5) The longest sequence of such correlated peaks is saved. If no sequence is found, the test concludes with a fail condition.

6) A process or method functionally defined by execution of code consistent with the following looks at the time in the audio sample of the first correlated peak and subtracts the pulse period until the value is less than or equal to two pulse periods.

```
int PeakDetector::EstimateDelay( ) {
  // -1 is returned as a failure condition
  if (mCorrelatedPeaks.size( )==0) {
    return -1;
  }
  if (mCorrelatedPeaks.size( )<MIN_PEAKS &&
      mPeaks.size( )/mCorrelatedPeaks.size( )>3) {
    // low confidence of any solution
    return -1;
  }
  //take first correlated peak location as
  //starting point
  int startingPoint=
      mCorrelatedPeaks.begin( )→first.sample;
  //now back up until a reasonable point (150%
  //of correlation distance)
  while (startingPoint>1.5*mCorrelationDistance) {
    startingPoint-=mCorrelationDistance;
  }
  return startingPoint;
}
```

7) This value (from step 6) is returned as the estimated round-trip latency.

8) In some embodiments, the preceding steps can be repeated (e.g., 5 times), with outlying results (e.g., highest and lowest values) discarded and the remaining results (e.g., three remaining results) averaged to yield a final round-trip latency estimate.

Estimated round-trip latency is used to adjust a preroll of captured vocals for alignment with backing or other vocal tracks. In this way, device-specific latency is determined and compensated.

Crowd-Sourcing Embodiments

It will be appreciated based on the description herein that round-trip latency estimation and preroll adjustments may be performed based on measurements performed at a particular device instance and/or, in some embodiments, may be crowd-sourced based on a representative sample of like devices and supplied for preroll adjustment even on device instances at which no round-trip latency estimation is directly or explicitly performed. Thus, as described above, test signals may be supplied and captured at a representative subset of devices such as described above and used to inform preroll adjustments at other devices that have a same or similar configuration. Alternatively or in addition, in some embodiments, vocal performance captures (rather than test signals) may be used to compute offsets that include input and output latencies.

An exemplary technique based on captures of user vocals performed against a known (or knowable) backing track is described next. As with the test signal techniques just described, temporal offsets between corresponding audio features of audibly rendered output and captured audio input signals are computationally determined. In general, audio features of captured vocals, such as vocal onsets, computationally discernible phrase structuring, etc., will be understood to temporally align with corresponding features of the backing track, such as computationally discernible beats, score-coded or computationally discernible phrase structure, etc. However, given the somewhat lesser precision of correspondence, in any given sample, between audio features of the backing track and those of captured vocals, statistical scoring may be employed. For example, in some embodiments, samples obtained based on signals captures at large numbers of like devices (typically 300+) may be used to characterize round-trip latencies for very much larger numbers (typically 3000+, 30,000+ or more) of devices that have a same or similar hardware/software configuration as a sampled device subset.

Latency Estimation Technique—Crowd-Sourced, Based on Capture Performances

As summarized above, while purpose-built audio test signals may be used to estimate round-trip latency in a manner such as described above, it is also possible to estimate latency based on audio signals captured in a more ordinary course of device operation, such as using vocal performances captured at mobile handheld devices that configured to execute a karaoke-style vocal capture application. For example, by associating an audio signal encoding of a user vocal performance captured at a given device with a particular configuration (e.g., hardware model, firmware version, operating system version and/or audio subpath used, etc.) and processing the audio signal, it is possible to characterize latency of that configuration. By processing many such audio signals captured at many such devices of varying configurations, it is possible accumulate a crowd-sourced data set and compute latency-based offsets. Those computed latency-based offsets are then, in turn, supplied or exposed to devices of same or similar configuration and used to adjust a preroll of captured vocals for alignment with backing or other vocal tracks. As before, device-specific latency is determined and compensated.

In some embodiments and from the perspective of an individual device (e.g., a mobile handheld device configured to execute a karaoke-style vocal capture application), such a technique is implemented as follows:

1) Capture the vocal performance via the mobile device;
2) Upload an audio signal encoding of the captured vocal performance to content server(s) or to a service platform.
3) On the server(s) or service platform:
   a) Attempt to align the performance to an associated backing track (e.g., to an audio signal encoding that corresponds to the backing track against which the vocal performance was captured). In some embodiments, alignments are calculated as follows:
      i) Perform the following actions at various offsets and score the chance that this offset is correct (each performance will have lots of scores).
      ii) Score is determined by:
         (1) Determining temporal positions in the song (e.g., as encoded in a score), or the temporal positions in an audio signal encoding that corresponds to the backing track, where syllables computationally identified in the audio signal encoding of the captured vocal performance match beats computationally identified in the backing track.

(2) At the current offset, measure the time between the peak of an identified syllable in the vocal track and the identified beat in the backing track.

b) Record the device configuration (e.g., hardware model, OS, audio subpath used) and the scoring matrix.

c) Based on measurements of ~300+ performances for a given device configuration, determine the offset that best characterizes latency in that device configuration.

d) Provide the determined offset for device configuration the device configuration, e.g., by supplying or exposing the crowd-sourced data from the server(s) or service platform.

4) At individual mobile devices, apply the offset determined and supplied or exposed for the particular device configuration.

Karaoke-Style Vocal Performance Capture, Generally

Although embodiments of the present invention are not necessarily limited thereto, mobile phone-hosted, pitch-corrected, karaoke-style, vocal capture provides a useful descriptive context in which the latency estimations and characteristic devices described above may be understood relative to captured vocals, backing tracks and audio processing. Likewise round trip latencies will be understood with respect to signal processing flows summarized below and detailed in the commonly-owned, U.S. Provisional Application No. 61/680,652, filed Aug. 7, 2012, which is incorporated herein by reference.

Figure 2:
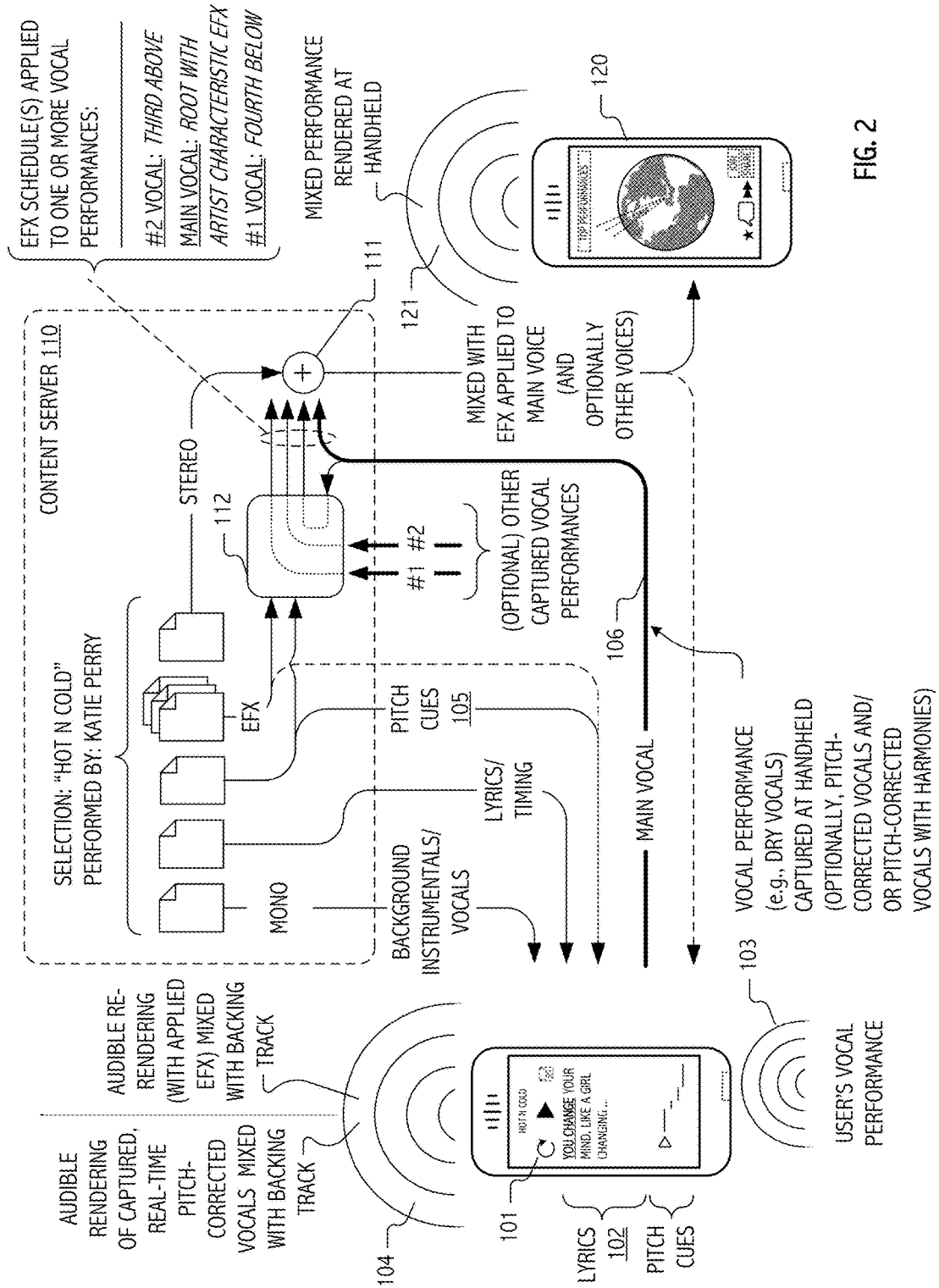
FIG. 2 depicts information flows amongst illustrative devices and a content server in accordance with some karaoke-type vocal capture system configurations in which latencies may be estimated for a given device in accordance with some embodiments of the present invention(s).

In some embodiments such as illustrated in FIG. 2, a handheld device 101 hosts software that executes in coordination with a content server to provide vocal capture and continuous real-time, score-coded pitch correction and harmonization of the captured vocals. As is typical of karaoke-style applications (such as the "I am T-Pain" application for iPhone originally released in September of 2009 or the later "Glee" application, both available from Smule, Inc.), a backing track of instrumentals and/or vocals can be audibly rendered for a user/vocalist to sing against. In such cases, lyrics may be displayed (102) in correspondence with the audible rendering so as to facilitate a karaoke-style vocal performance by a user. In some cases or situations, backing audio may be rendered from a local store such as from content of a music library resident on the handheld.

User vocals 103 are captured at handheld 101, pitch-corrected continuously and in real-time (again at the handheld) and audibly rendered (see 104, mixed with the backing track) to provide the user with an improved tonal quality rendition of his/her own vocal performance. Pitch correction is typically based on score-coded note sets or cues (e.g., pitch and harmony cues 105), which provide continuous pitch-correction algorithms with performance synchronized sequences of target notes in a current key or scale. In addition to performance synchronized melody targets, score-coded harmony note sequences (or sets) provide pitch-shifting algorithms with additional targets (typically coded as offsets relative to a lead melody note track and typically scored only for selected portions thereof) for pitch-shifting to harmony versions of the user's own captured vocals. In some cases, pitch correction settings may be characteristic of a particular artist such as the artist that performed vocals associated with the particular backing track.

In the illustrated embodiment, backing audio (here, one or more instrumental and/or vocal tracks), lyrics and timing information and pitch/harmony cues are all supplied (or demand updated) from one or more content servers or hosted service platforms (here, content server 110). For a given song and performance, such as "Hot N Cold," several versions of the background track may be stored, e.g., on the content server. For example, in some implementations or deployments, versions may include:

uncompressed stereo way format backing track,
uncompressed mono way format backing track and
compressed mono m4a format backing track.

In addition, lyrics, melody and harmony track note sets and related timing and control information may be encapsulated as a score coded in an appropriate container or object (e.g., in a Musical Instrument Digital Interface, MIDI, or Java Script Object Notation, json, type format) for supply together with the backing track(s). Using such information, handheld 101 may display lyrics and even visual cues related to target notes, harmonies and currently detected vocal pitch in correspondence with an audible performance of the backing track(s) so as to facilitate a karaoke-style vocal performance by a user.

Thus, if an aspiring vocalist selects on the handheld device "Hot N Cold" as originally popularized by the artist Katie Perry, HotNCold.json and HotNCold.m4a may be downloaded from the content server (if not already available or cached based on prior download) and, in turn, used to provide background music, synchronized lyrics and, in some situations or embodiments, score-coded note tracks for continuous, real-time pitch-correction shifts while the user sings. Optionally, at least for certain embodiments or genres, harmony note tracks may be score coded for harmony shifts to captured vocals. Typically, a captured pitch-corrected (possibly harmonized) vocal performance is saved locally on the handheld device as one or more way files and is subsequently compressed (e.g., using lossless Apple Lossless Encoder, ALE, or lossy Advanced Audio Coding, AAC, or vorbis codec) and encoded for upload (106) to content server 110 as an MPEG-4 audio, m4a, or ogg container file. MPEG-4 is an international standard for the coded representation and transmission of digital multimedia content for the Internet, mobile networks and advanced broadcast applications. OGG is an open standard container format often used in association with the vorbis audio format specification and codec for lossy audio compression. Other suitable codecs, compression techniques, coding formats and/or containers may be employed if desired.

Depending on the implementation, encodings of dry vocal and/or pitch-corrected vocals may be uploaded (106) to content server 110. In general, such vocals (encoded, e.g., as way, m4a, ogg/vorbis content or otherwise) whether already pitch-corrected or pitch-corrected at content server 110 can then be mixed (111), e.g., with backing audio and other captured (and possibly pitch shifted) vocal performances, to produce files or streams of quality or coding characteristics selected accord with capabilities or limitations a particular target (e.g., handheld 120) or network. For example, pitch-corrected vocals can be mixed with both the stereo and mono way files to produce streams of differing quality. In some cases, a high quality stereo version can be produced for web playback and a lower quality mono version for streaming to devices such as the handheld device itself.

Performances of multiple vocalists may be accreted in response to an open call. In some embodiments, one set of vocals (for example, in the illustration of FIG. 2, main vocals captured at handheld 101) may be accorded prominence (e.g., as lead vocals). In general, a user selectable vocal effects schedule may be applied (112) to each captured and uploaded encoding of a vocal performance. For example, initially captured dry vocals may be processed (e.g., 112) at content server 100 in accord with a vocal effects schedule characteristic of Katie Perry's studio performance of "Hot N Cold." In some cases or embodiments, processing may include pitch correction (at server 100) in accord with previously described pitch cues 105. In some embodiments, a resulting mix (e.g., pitch-corrected main vocals captured, with applied EFX and mixed with a compressed mono m4a format backing track and one or more additional vocals, themselves with applied EFX and pitch shifted into respective harmony positions above or below the main vocals) may be supplied to another user at a remote device (e.g., handheld 120) for audible rendering (121) and/or use as a second-generation backing track for capture of additional vocal performances.

Persons of skill in the art having benefit of the present disclosure will appreciate that, given the audio signal processing described, variations computational performance characteristics and configurations of a target device may result in significant variations in temporal alignment between captured vocals and underlying tracks against which such vocals are captured. Persons of skill in the art having benefit of the present disclosure will likewise appreciate the utility of latency estimation techniques described herein for precisely tailoring latency adjustments suitable for a particular target device. Additional aspects of round-trip signal processing latencies characteristic of karaoke-type vocal capture will be appreciated with reference to signal processing flows summarized below with respect to FIGS. 3 and 4 and as further detailed in the commonly-owned, U.S. Provisional Application No. 61/680,652, filed Aug. 7, 2012, which is incorporated herein by reference.

Figure 3:
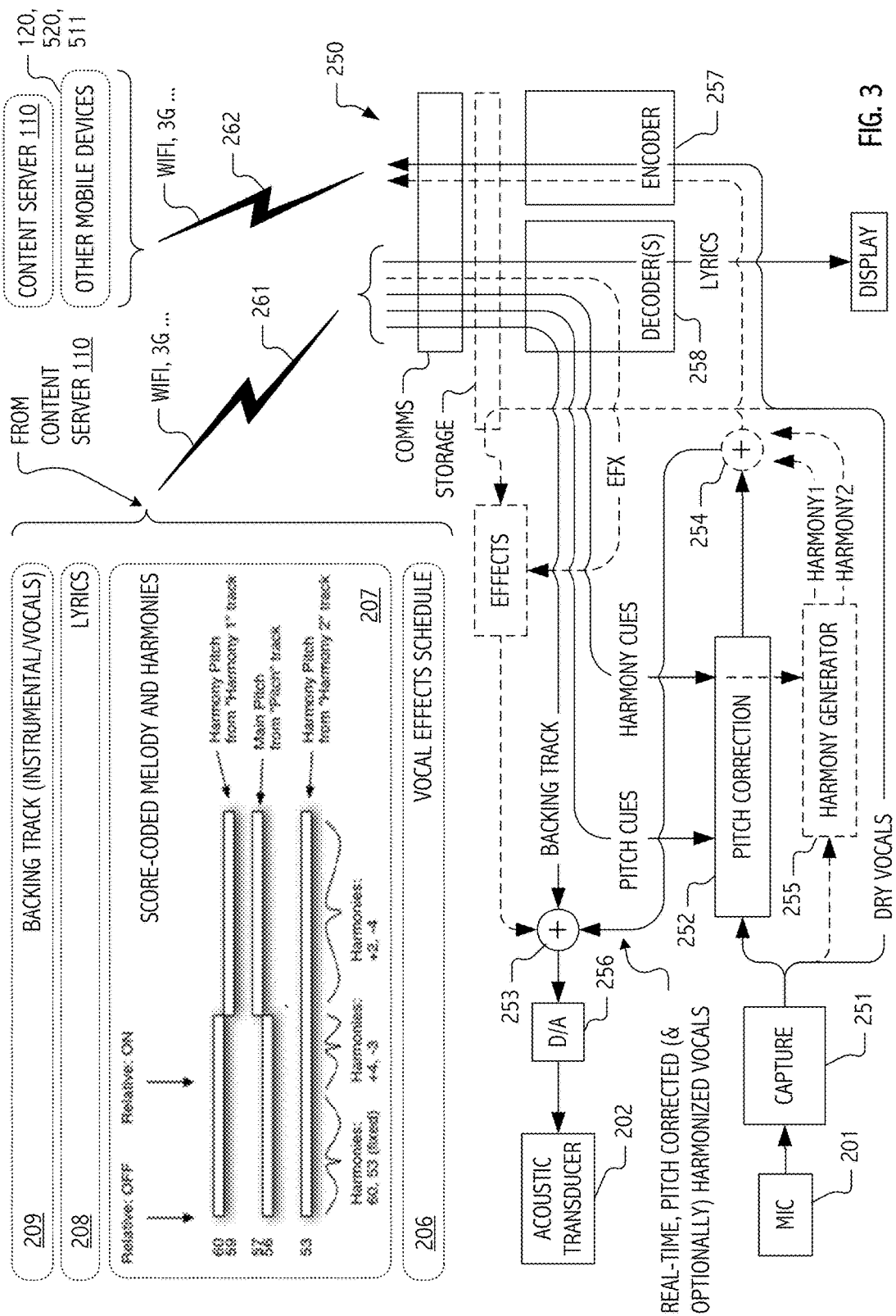
FIG. 3 is a flow diagram illustrating signal processing flows for a captured vocal performance, real-time continuous pitch-correction and optional harmony generation based on score-coded cues in accordance with some karaoke-type vocal capture system configurations in which latencies may be estimated for a given device in accordance with some embodiments of the present invention(s).

FIG. 3 is a flow diagram illustrating real-time continuous score-coded pitch-correction and/or harmony generation for a captured vocal performance in accordance with some vocal capture application deployments to devices in or for which techniques in accordance with the present invention(s) may be employed to estimate latency. As previously described, a user/vocalist sings along with a backing track karaoke style. Vocals captured (251) from a microphone input 201 are continuously pitch-corrected (252) to either main vocal pitch cues or, in some cases, to corresponding harmony cues in real-time for mix (253) with the backing track which is audibly rendered at one or more acoustic transducers 202. In some cases or embodiments, the audible rendering of captured vocals pitch corrected to "main" melody may optionally be mixed (254) with harmonies (HARMONY1, HARMONY2) synthesized from the captured vocals in accord with score coded offsets.

Figure 4:
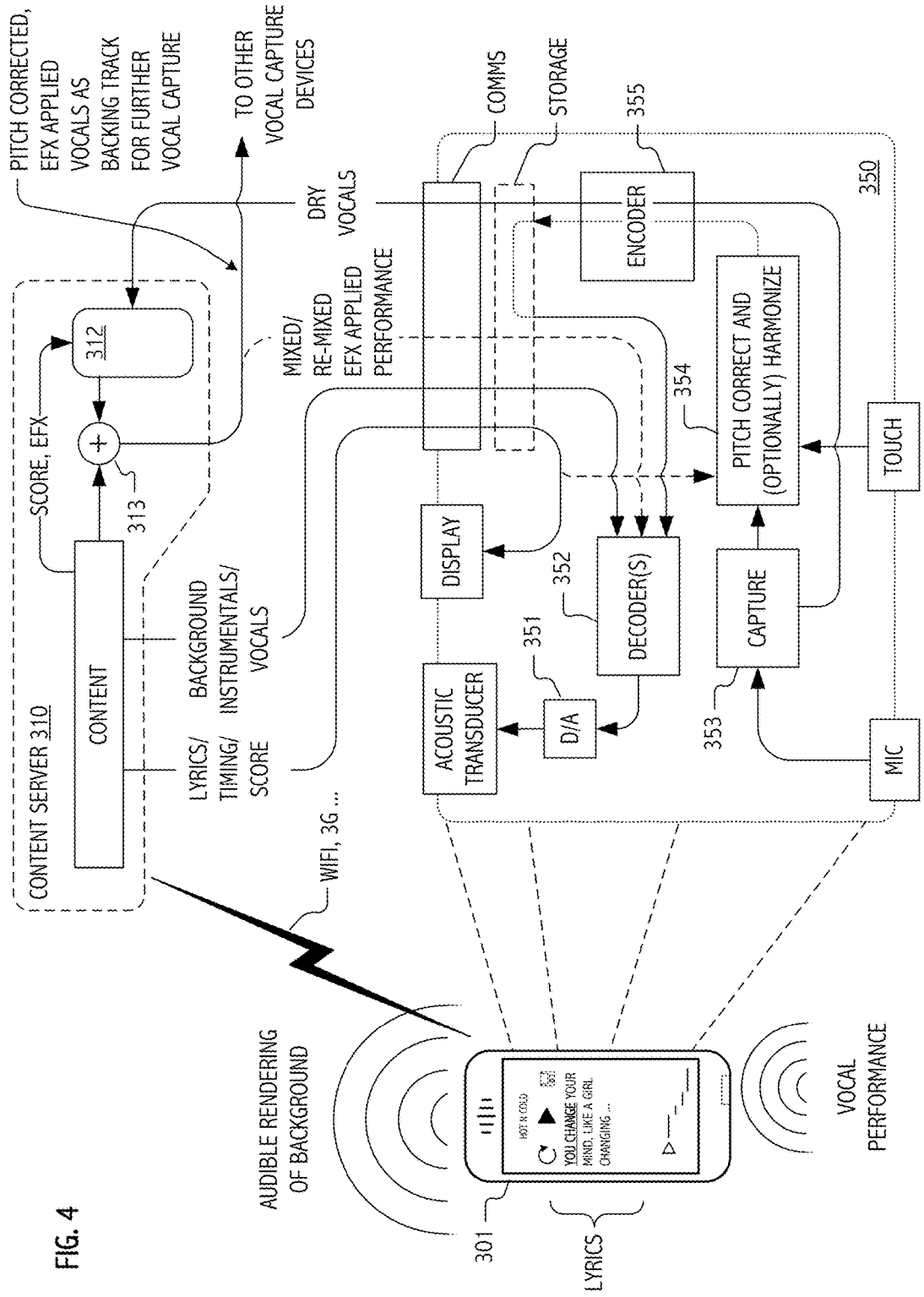
FIG. 4 is a functional block diagram of hardware and software components executable at a device for which latencies may be estimated for a given device in accordance with some embodiments of the present invention(s).

In general, persons of ordinary skill in the art will appreciate suitable allocations of signal processing techniques (sampling, filtering, decimation, etc.) and data representations to functional blocks (e.g., decoder(s) 352, digital-to-analog (D/A) converter 351, capture 253 and encoder 355) of a software executable to provide signal processing flows 350 illustrated in FIG. 4. Likewise, relative to the signal processing flows 250 and illustrative score coded note targets (including harmony note targets), persons of ordinary skill in the art will appreciate suitable allocations of signal processing techniques and data representations to functional blocks and signal processing constructs (e.g., decoder(s) 258, capture 251, digital-to-analog (D/A) converter 256, mixers 253, 254, and encoder 257) as in FIG. 3, implemented at least in part as software executable on a handheld or other portable computing device.

FIGS. 3 and 4 illustrate basic signal processing flows (250, 350) in accord with certain implementations suitable for a handheld, e.g., that illustrated as mobile device 101, to generate pitch-corrected and optionally harmonized vocals for audible rendering (locally and/or at a remote target device). In general, it is the latencies through these signal and processing paths out through an acoustic transducer (or audio output interface) and in though a microphone (or audio input interface) that together (potentially) with encoding, decoding, capture, and optional pitch correction, harmonization and/or effects processing define round-trip latency through the audio processing subsystem.

An Exemplary Mobile Device and Network

Figure 5:
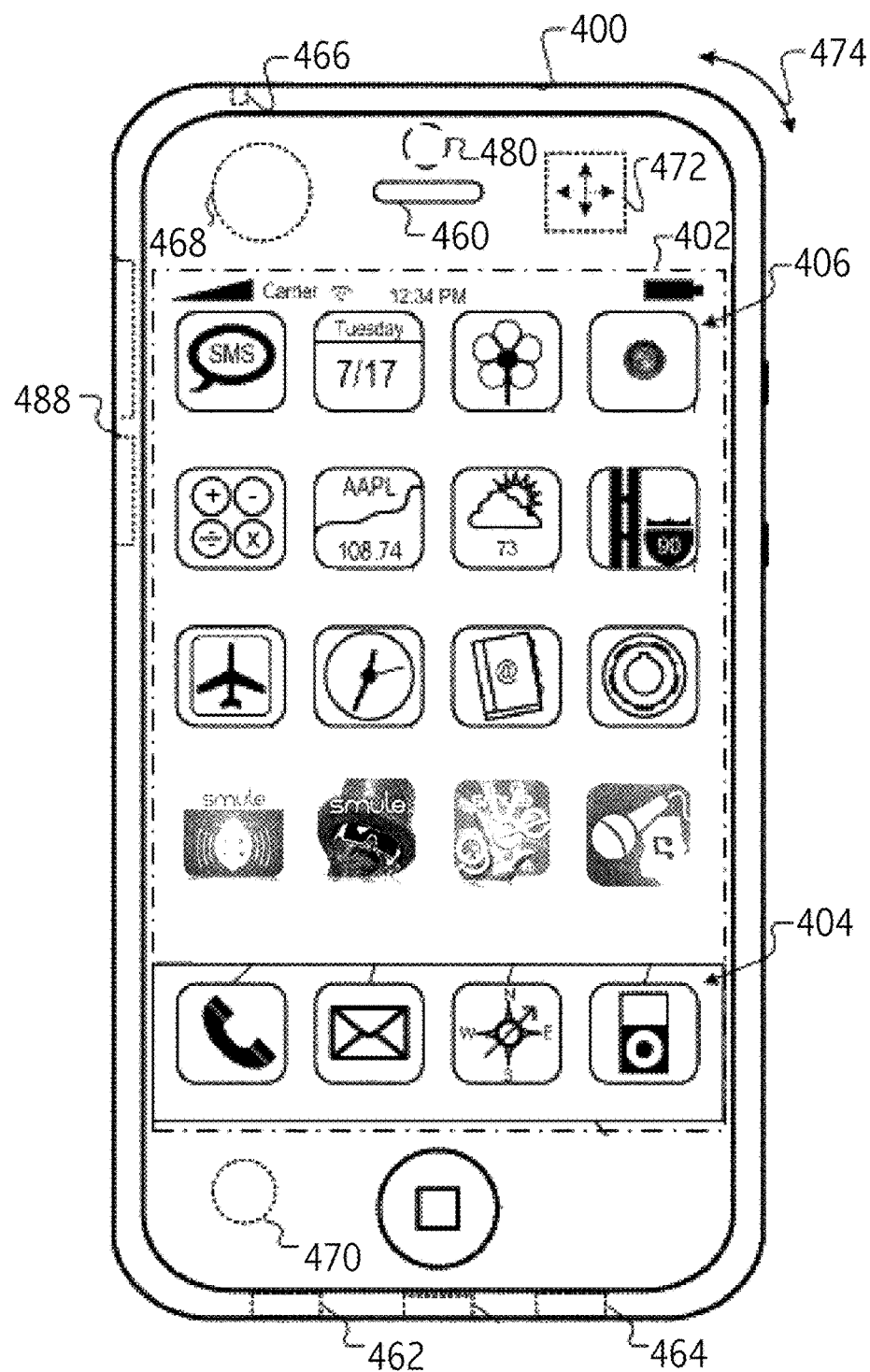
FIG. 5 illustrates features of a mobile device that may serve as a platform for execution of software implementations in accordance with some embodiments of the present invention.

FIG. 5 illustrates features of a mobile device that may serve as a platform for execution of software implementations in accordance with some embodiments of the present invention and for which latencies may be estimated as described herein. More specifically, FIG. 5 is a block diagram of a mobile device 400 that is generally consistent with commercially-available versions of an iPhone handheld device. Although embodiments of the present invention are certainly not limited to iPhone deployments or applications (or even to iPhone-type devices), the iPhone device, together with its rich complement of sensors, multimedia facilities, application programmer interfaces and wireless application delivery model, provides a highly capable platform on which to deploy certain implementations. Based on the description herein, persons of ordinary skill in the art will appreciate a wide range of additional mobile device platforms that may be suitable (now or hereafter) for a given implementation or deployment of the inventive techniques described herein.

Summarizing briefly, mobile device 400 includes a display 402 that can be sensitive to haptic and/or tactile contact with a user. Touch-sensitive display 402 can support multi-touch features, processing multiple simultaneous touch points, including processing data related to the pressure, degree and/or position of each touch point. Such processing facilitates gestures and interactions with multiple fingers, chording, and other interactions. Of course, other touch-sensitive display technologies can also be used, e.g., a display in which contact is made using a stylus or other pointing device.

Typically, mobile device 400 presents a graphical user interface on the touch-sensitive display 402, providing the user access to various system objects and for conveying information. In some implementations, the graphical user interface can include one or more display objects 404, 406. In the example shown, the display objects 404, 406, are graphic representations of system objects. Examples of system objects include device functions, applications, windows, files, alerts, events, or other identifiable system objects. In some embodiments of the present invention, applications, when executed, provide at least some of the digital acoustic functionality described herein.

Typically, the mobile device 400 supports network connectivity including, for example, both mobile radio and wireless internetworking functionality to enable the user to travel with the mobile device 400 and its associated network-enabled functions. In some cases, the mobile device 400 can interact with other devices in the vicinity (e.g., via Wi-Fi, Bluetooth, etc.). For example, mobile device 400 can be configured to interact with peers or a base station for one or more devices. As such, mobile device 400 may grant or deny network access to other wireless devices.

Mobile device 400 includes a variety of input/output (I/O) devices, sensors and transducers. For example, a speaker 460 and a microphone 462 are typically included to facilitate audio, such as the capture of vocal performances and audible rendering of backing tracks and mixed pitch-corrected vocal performances as described elsewhere herein. In some embodiments of the present invention, speaker 460 and microphone 662 may provide appropriate transducers for techniques described herein. An external speaker port 464 can be included to facilitate hands-free voice functionalities, such as speaker phone functions. An audio jack 466 can also be included for use of headphones and/or a microphone. In some embodiments, an external speaker and/or microphone may be used as a transducer for the techniques described herein.

Other sensors can also be used or provided. A proximity sensor 468 can be included to facilitate the detection of user positioning of mobile device 400. In some implementations, an ambient light sensor 470 can be utilized to facilitate adjusting brightness of the touch-sensitive display 402. An accelerometer 472 can be utilized to detect movement of mobile device 400, as indicated by the directional arrow 474. Accordingly, display objects and/or media can be presented according to a detected orientation, e.g., portrait or landscape. In some implementations, mobile device 400 may include circuitry and sensors for supporting a location determining capability, such as that provided by the global positioning system (GPS) or other positioning systems (e.g., systems using Wi-Fi access points, television signals, cellular grids, Uniform Resource Locators (URLs)) to facilitate geocodings. Mobile device 400 can also include a camera lens and sensor 480. In some implementations, the camera lens and sensor 480 can be located on the back surface of the mobile device 400. The camera can capture still images and/or video for association with captured pitch-corrected vocals.

Mobile device 400 can also include one or more wireless communication subsystems, such as an 802.11b/g communication device, and/or a Bluetooth™ communication device 488. Other communication protocols can also be supported, including other 802.x communication protocols (e.g., WiMax, Wi-Fi, 3G), code division multiple access (CDMA), global system for mobile communications (GSM), Enhanced Data GSM Environment (EDGE), etc. A port device 490, e.g., a Universal Serial Bus (USB) port, or a docking port, or some other wired port connection, can be included and used to establish a wired connection to other computing devices, such as other communication devices 400, network access devices, a personal computer, a printer, or other processing devices capable of receiving and/or transmitting data. Port device 490 may also allow mobile device 400 to synchronize with a host device using one or more protocols, such as, for example, the TCP/IP, HTTP, UDP and any other known protocol.

Figure 6:
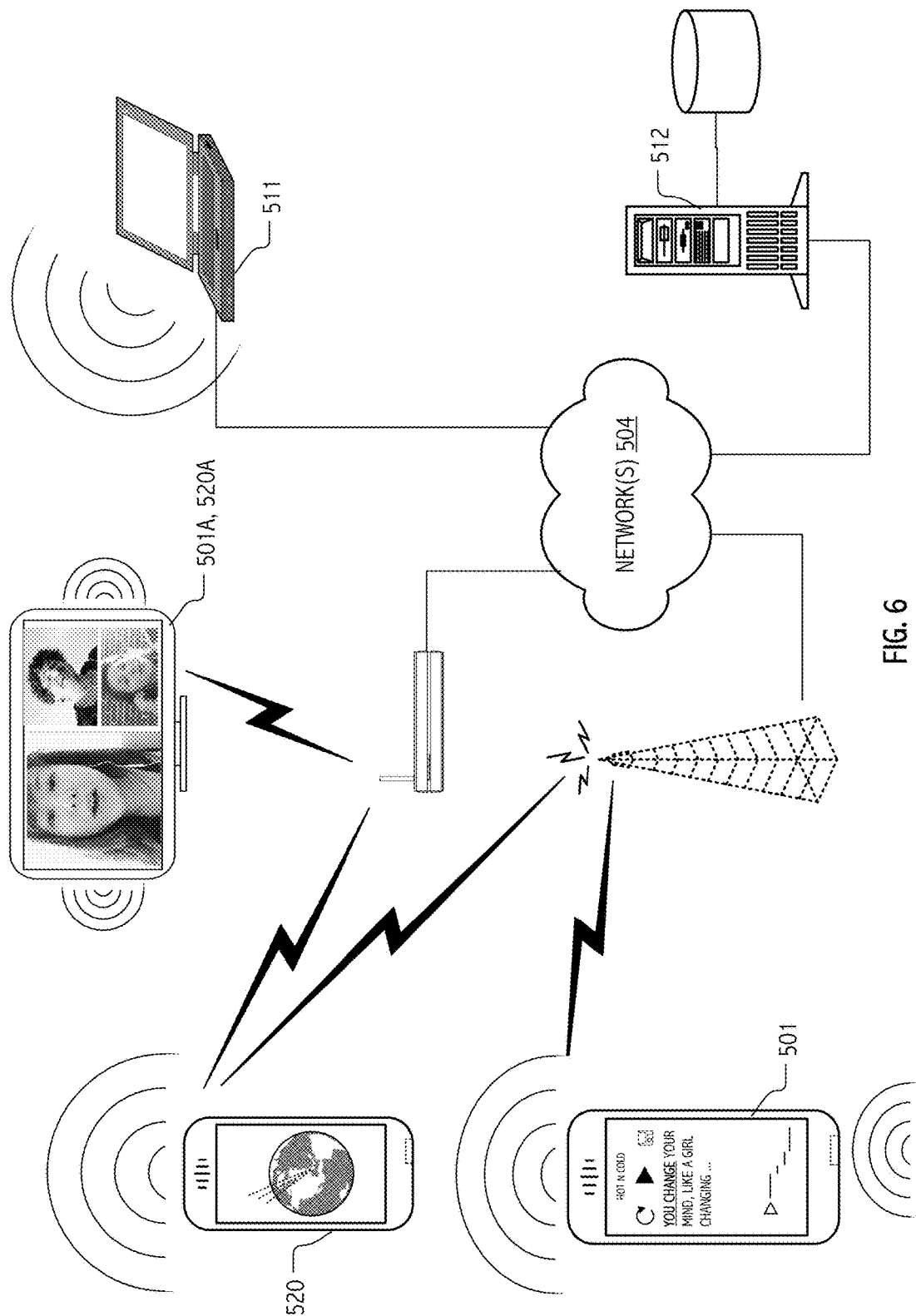
FIG. 6 is a network diagram that illustrates cooperation of exemplary devices in accordance with some embodiments of the present invention.

FIG. 6 illustrates respective instances (501 and 520) of a portable computing device such as mobile device 400 programmed with user interface code, pitch correction code, an audio rendering pipeline and playback code in accord with the functional descriptions herein. Device instance 501 operates in a vocal capture and continuous pitch correction mode, while device instance 520 operates in a listener mode.

An additional television-type display and/or set-top box equipment-type device instance 520A is likewise depicted operating in a presentation or playback mode, although as will be understood by persons of skill in the art having benefit of the present description, such equipment may also operate as part of a vocal audio and performance synchronized video capture facility (501A). Each of the aforementioned devices communicate via wireless data transport and intervening networks 504 with a server 512 or service platform that hosts storage and/or functionality explained herein with regard to content server 110, 210. Captured, pitch-corrected vocal performances may (optionally) be streamed from and audibly rendered at laptop computer 511.

OTHER VARIATIONS AND EMBODIMENTS

While the invention(s) is (are) described with reference to various embodiments, it will be understood that these embodiments are illustrative and that the scope of the invention(s) is not limited to them. For example, although latency testing has been described generally with respect to a particular end-user device, it will be appreciated that similar techniques may be employed to systematize latency testing for particular device types and generate presets that may be provided to, or retrieved by, end-user devices.

For example, in some embodiments, in order to minimize the need for users to themselves run tests such as detailed above (which can, in some cases, be prone to environmental issues, noise, microphone position, or user error), it is also possible to use the developed techniques to estimate latency compensation "presets" which are, in turn, stored in a database and retrieved on demand. When a user first attempts to review a recording, a device model identifier (and optionally configuration info) is sent to a server and the database is checked for a predetermined latency preset for the device model (and configuration). If a suitable preset is available, it is sent to the device and used as a default preroll for recordings when reviewing or rendering. In this case, the latency compensation is handled automatically and no user intervention is required. Accordingly and based on the present description, it will be appreciated that the automated processes described herein can be executed outside the context of the end-user application to efficiently estimate latency presets for a large number of target device models (and configurations), with the goal of providing an automated latency-compensation with no intervention for large percentage of a deployed user and platform base.

Likewise, many variations, modifications, additions, and improvements are possible. For example, while pitch correction vocal performances captured in accord with a karaoke-style interface have been described, other variations will be appreciated. Furthermore, while certain illustrative signal processing techniques have been described in the context of certain illustrative applications, persons of ordinary skill in the art will recognize that it is straightforward to modify the described techniques to accommodate other suitable signal processing techniques and effects.

Embodiments in accordance with the present invention may take the form of, and/or be provided as, a computer program product encoded in a machine-readable medium as instruction sequences and other functional constructs of software, which may in turn be executed in a computational system (such as a iPhone handheld, mobile or portable computing device, or content server platform) to perform methods described herein. In general, a machine readable medium can include tangible articles that encode information in a form (e.g., as applications, source or object code, functionally descriptive information, etc.) readable by a machine (e.g., a computer, computational facilities of a mobile device or portable computing device, etc.) as well as tangible storage incident to transmission of the information. A machine-readable medium may include, but is not limited to, magnetic storage medium (e.g., disks and/or tape storage); optical storage medium (e.g., CD-ROM, DVD, etc.); magneto-optical storage medium; read only memory (ROM); random access memory (RAM); erasable programmable memory (e.g., EPROM and EEPROM); flash memory; or other types of medium suitable for storing electronic instructions, operation sequences, functionally descriptive information encodings, etc.

In general, plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the invention(s).

What is claimed is:

1. A system comprising:
a network-resident media content server or service platform;
a non-transitory memory;
one or more hardware processors coupled to the non-transitory memory and configured to read instructions from the non-transitory memory to cause the network-resident media content server or service platform to perform operations comprising:
receiving, for audio signal captures performed at a first subset of a plurality of network-connected computing devices configured for vocal performance capture, computationally-determined temporal offsets between audio features of the respective audio captures and one or more corresponding audio signals,
wherein the first subset of the plurality of network-connected computing devices are of a consistent hardware and software configuration, and
wherein at least some of the plurality of devices differ in hardware or software configuration from those of the first subset;
based on the computationally-determined temporal offsets, characterizing a round-trip latency through audio systems of devices that match the hardware and software configuration of the first subset; and
supplying the characterized round-trip latency to device instances of the first subset including those for which no temporal offset has been explicitly determined based on audio signal capture at the respective device instance for use in connection with subsequent vocal captures thereon.

2. The system of claim 1, wherein consistency of hardware and software configuration shared by devices of the first subset includes consistency of plural attributes selected from the set of:
hardware model;
firmware version;
operating system version; and
audio subpath(s) used for audio playback and capture.

3. The system of claim 1,
wherein audio signal capture-based determinations of round-trip latency are computed based on a first number of network-connected computing device instances of a first type;
wherein a second number of network-connected computing device instances of the first type are supplied with the characterized round-trip latency for use in connection with subsequent vocal captures thereon; and
wherein the second number substantially exceeds the first number by a factor of at least ten (10×).

4. The system of claim 1, further comprising software executable on a least some of the network-connected computing device instances of a first type to, at each such device instance,
audibly render a backing track; and
capture vocals performed by a user against the backing track for use in the characterization of round-trip latency for the network-connected computing devices of the first type,
wherein the computational determination of temporal offset is between respective audio features of vocal captures and backing track.

5. The system of claim 1, wherein the computational determination of temporal offset is performed at the network-resident media content server or service platform.

6. The system of claim 1, further comprising:
software executable on at least some of the network-connected computing device instances of a first type to, at each such device instance, supply a test signal at a respective audio output thereof and to capture a corresponding audio signal at an audio input thereof for use in the characterization of round-trip latency for the network-connected computing devices of the first type.

7. The system of claim 1, wherein the computing devices are selected from the set of a mobile phone, a personal digital assistant, a laptop or notebook computer, a pad-type computer and a net book.

8. The system of claim 1, wherein at least some of the computing devices are selected from the set of audiovisual media devices and connected set-top boxes.

9. A system, as in claim 1, wherein the computational determination of temporal offset is performed at one or more network-connected computing devices of the first subset of the plurality of network-connected computing devices.

10. A method comprising:
crowdsourcing round-trip latency characterizations for a plurality of network-connected computing devices configured for vocal performance capture;
for a first subset of the plurality of network-connected computing devices, the first subset having a consistent hardware and software configuration:
sampling a first number of network-connected computing devices of the first subset to characterize round-trip latency through audio systems of substantially all devices of the first subset, wherein the sampling includes audio signal captures and determinations of temporal offset between audio features of the respective audio signal captures and corresponding audio signals; and
supplying the characterized round-trip latency to a first network-connected computing device of the first subset for use in connection with subsequent vocal captures thereon, wherein the first network-connected computing device is not of the first number of network-connected computing devices.

11. The method of claim 10,
wherein the audio signal captures include vocal audio captured karaoke-style at a particular device instance against an audible rendering of a corresponding backing track.

12. The method of claim 10,
wherein the audio signal captures include captures, at an audio input of a particular device instance, a test signal supplied at audio output of the particular device instance.

13. The method of claim 10, wherein the sampling includes:
audibly rendering a backing track at a particular device instance; and
at the device instance, capturing vocals performed by a user against the backing track,
wherein the determination of temporal offset is between respective audio features of the vocal capture and the backing track.

14. The method of claim 10, wherein the determination of temporal offset is performed at a network-resident media content server or service platform.

15. The method of claim 10, wherein the sampling includes:
supplying a test signal at a respective audio output of a particular device instance; and
capturing a corresponding audio signal at an audio input of the particular device instance,
wherein the determination of temporal offset is between respective audio features of the test signal as supplied and captured.

* * * * *